Sept. 4, 1951     JOSE ADOLFO MACAU V.     2,566,458

ILLUMINATED SIGN

Filed March 29, 1948

Jose Adolfo Macau V.
INVENTOR.

BY *Clarence A. O'Brien and Harvey B. Jacobson*
Attorneys

Patented Sept. 4, 1951

2,566,458

UNITED STATES PATENT OFFICE 2,566,458

ILLUMINATED SIGN

Jose Adolfo Macau V., Santo Suarez, Habana, Cuba

Application March 29, 1948, Serial No. 17,762

1 Claim. (Cl. 40—130)

This invention relates to new and useful improvements in illuminated signs and the primary object of the present invention is to provide a device for obtaining luminous effects in color glass surfaces by total refraction.

Another important object of the present invention is to provide a device for obtaining luminous effects as if in bold relief in a refringent medium, either during daytime or at night, with the advantage that due to an external cut off of the refraction of light rays originated from a hidden source, the drawings or images, drawn over the outer surface of a transparent plate become the only illuminated spot.

A further object of the present invention is to provide a device for obtaining luminous effects in colored glass surfaces that is so designed as to facilitate the same to be employed as an aid for lecturers on scientific matters whenever the shifting of images may be necessary and more particularly when it is necessary to apply images or indicia upon the glass surface of the present invention and to conveniently remove the images or indicia therefrom.

A still further aim of the present invention is to provide a device of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
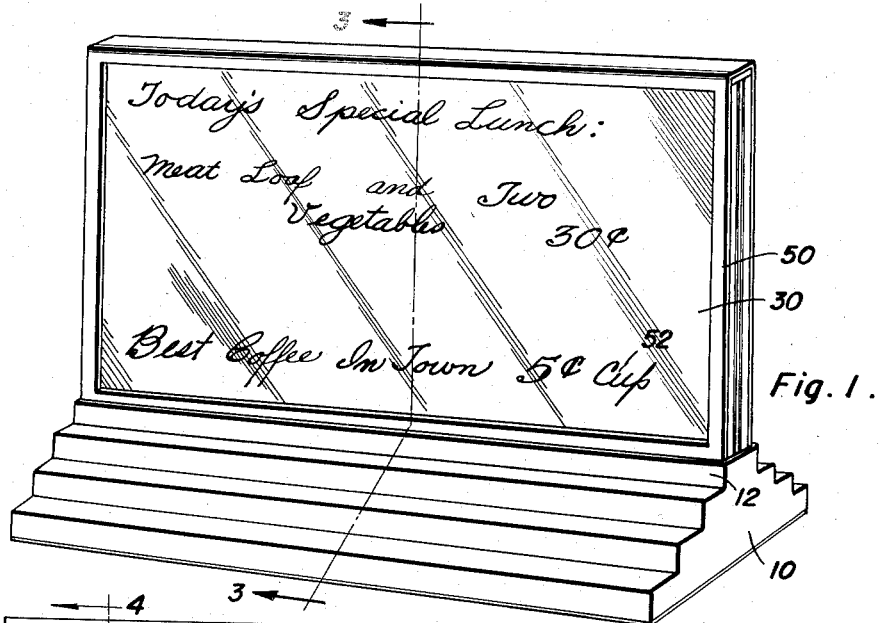
Figure 1 is a perspective view of the illuminated sign constructed in accordance with the present invention.
Figure 2:
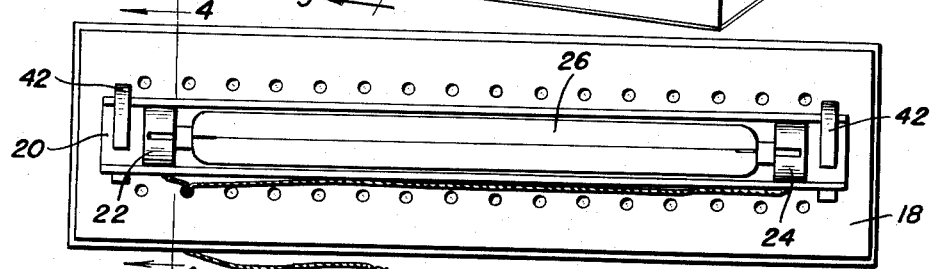
Figure 2 is a top plan view of the present invention, the glass holding frame, housing, and glass surfaces removed therefrom.
Figure 3:
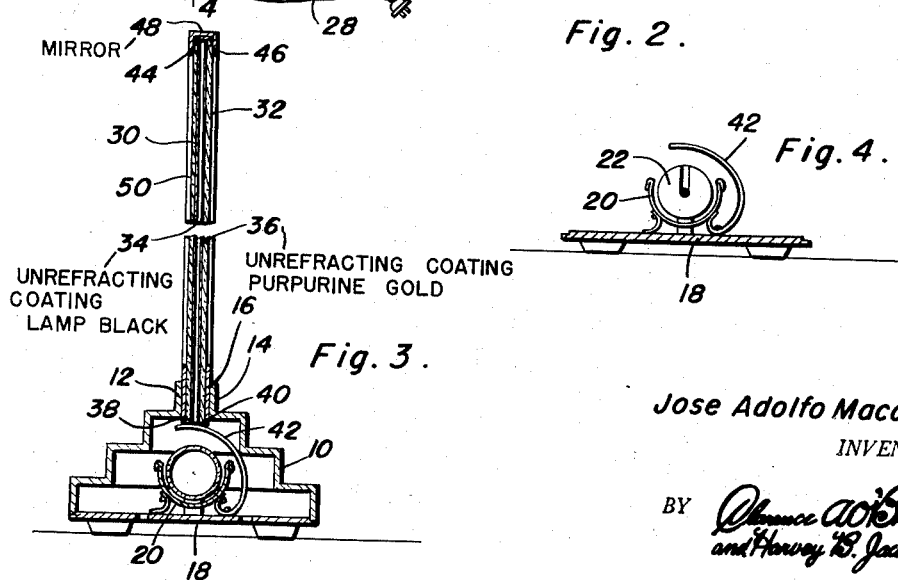
Figure 3 is a transverse vertical sectional view of the present invention taken substantially on the plane of section line 3—3 of Figure 1, and showing the glass holding frame, housing and glass surfaces applied thereto in section; and, Figure 4 is a transverse vertical sectional view taken substantially on the plane of section line 4—4 of Figure 2.
Figure 4:
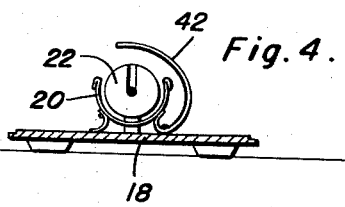

Referring now to the drawings in detail, wherein for the purpose of illustration, there is disclosed a preferred embodiment of the present invention, the numeral 10 represents a hollow support or housing preferably of resilient material and formed with a pair of spaced upper walls 12 and 14 between which there is provided a longitudinal opening 16.

Suitably fixed on the perforated, removable bottom wall 18 of the housing 10 is an elongated concavo-convexed reflector or trough 20 that engages a pair of spaced, complementary sockets 22 and 24. The contact fingers (not shown) of a preferably fluorescent light bulb 26 that is loosely positioned in the reflector 20 to direct light rays upwardly through the opening 16. The sockets 22 and 24 are connected to an electric cord 28 that enters the housing 10 through a selected perforation in the bottom wall 18.

The numerals 30 and 32 represent a pair of spaced parallel, substantially rectangular sheets of plate glass, the opposed faces of which are printed with unrefracting coatings 34 and 36, one of which is preferably lamp black and the other of which is purpurine gold. The lower edges 38 and 40 of these sheets or panes of glass 30 and 32 extend through the opening 16 into the housing 10 and are supported by a plurality of arcuate, resilient fingers 42 that are fixed to the bottom wall 18.

Suitably fixed to the upper edges 44 and 46 of the panes of glass 30 and 32, is a mirror 48 having a reflecting face that opposes the opening 16 in the housing 10.

The panes of glass 30 and 32 are held relative to each other by a retainer frame 50 that preferably encloses all edges of the panes of glass but the lower edges 38 and 40 thereof.

In practical use of the present invention as the light bulb is energized, the rays of light radiated therefrom pass through the lower edges 38 and 40 of the panes of glass 30 and 32 in an upward direction until they strike the reflecting face of the mirror 48 whereupon the same will be reflected back to the reflector 20. When a pencil made of unrefracting material, such as soft carbon lead, is employed to write or mark on the outer faces of the plates, the indicia or images 52 so formed will become visible and the effect is the same as if drawn in bold relief. Obviously, the coating of lamp black will facilitate the visibility of the indicia on the outer face of the plate 30 during the daytime whereas the coating of purpurine gold will facilitate the visibility of the indicia on the outer face of the plate 32 at night time.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

Means for obtaining bold relief effects on transparent glass plates comprising a pair of juxtapositioned substantially rectangular glass plates having lower edges received in said base, a coating of smoke black on the inner surface of one of said plates, a coating of purpurine gold on the inner surface of the other plate, a frame joining the exposed edges of said plates, a mirror supported on the upper edges of said plates and held on the upper edges of said plates by said frame, and a light tube filled with a rare gas mounted in said base directly beneath the lower edges of said plates.

JOSE ADOLFO MACAU V.

REFERENCES CITED

The following references are of record in the file of this patent:

UNITED STATES PATENTS

| Number | Name | Date |
| --- | --- | --- |
| 1,146,361 | Spencer | July 13, 1915 |
| 2,082,724 | Shelor | June 1, 1937 |
| 2,118,320 | McEwen | May 24, 1938 |
| 2,159,095 | Madan | May 23, 1939 |
| 2,286,246 | Yearta | June 16, 1942 |
| 2,297,851 | Wyss | Oct. 6, 1942 |

FOREIGN PATENTS

| Number | Country | Date |
| --- | --- | --- |
| 392,628 | Great Britain | May 25, 1933 |